US006476601B2

United States Patent
Zharski et al.

(10) Patent No.: US 6,476,601 B2
(45) Date of Patent: Nov. 5, 2002

(54) POSITION SENSOR FOR ARMATURE OF STEP MAGNETOELECTRIC MOTOR

(75) Inventors: Vladimir Vladimirovich Zharski, 26 Fedotov Str., Minsk 220118 (BY); Nickolai Kalistratovich Trusov, Minsk (BY)

(73) Assignee: Vladimir Vladimirovich Zharski (BY)

( * ) Notice: Subject to any disclaimer, the term of this patent is extended or adjusted under 35 U.S.C. 154(b) by 0 days.

(21) Appl. No.: 09/768,388

(22) Filed: Jan. 24, 2001

(65) Prior Publication Data

US 2001/0010463 A1 Aug. 2, 2001

(30) Foreign Application Priority Data

Jan. 27, 2000 (BY) .......................... A20000079

(51) Int. Cl.$^7$ ................................. G01B 7/14
(52) U.S. Cl. ................... 324/207.22; 310/135
(58) Field of Search ................. 324/207.2, 207.25, 324/207.13, 207.22; 318/135, 685; 310/13, 168; 338/32 R, 32 H

(56) References Cited

U.S. PATENT DOCUMENTS 3,836,835 A * 9/1974 Sawyer ....................... 318/685
4,204,158 A * 5/1980 Rlcouard et al. .......... 324/207.2
5,754,042 A * 5/1998 Schroeder et al. ....... 324/207.25

FOREIGN PATENT DOCUMENTS

BY           2525        4/1996
SU        1432680       10/1988

* cited by examiner

Primary Examiner—Edward Lefkowitz
Assistant Examiner—Subhash Zaveri
(74) Attorney, Agent, or Firm—Volpe & Koenig, P.C.

(57) ABSTRACT

The invention relates to electrical engineering, in particular, to devices employed in a step magnetoelectric motor, and it is intended for generating the Sin and Cos of electric signals that uniquely determine an armature position relative to toothed structure of a stator. To increase the accuracy the sensor contains two composite U-shaped magnetic conductors, on pole cores of which the teeth are formed. The group coordinates difference of the teeth being equal to $(\alpha \pm 0,5)$ Z, where $\alpha$ is an integer, Z is the teeth spacing and 0,5 represents the decimal notation of ½. A permanent magnet is connected in series with one of the constituents of U-shaped magnetic conductors, and the magnetic induction converters are placed in proximity to the pair of the like magnetic poles of the magnetic conductors.

16 Claims, 11 Drawing Sheets

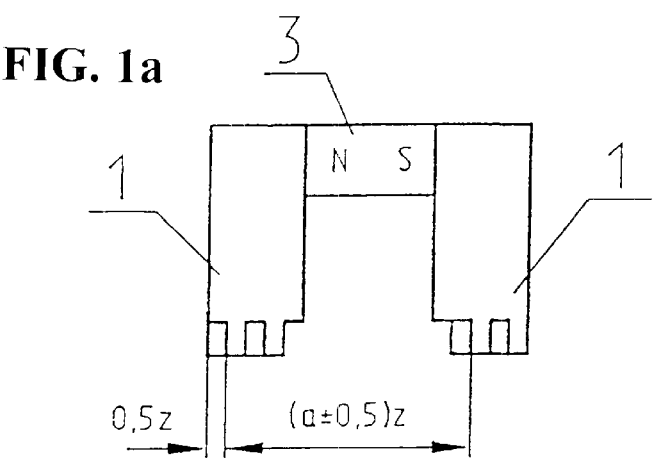
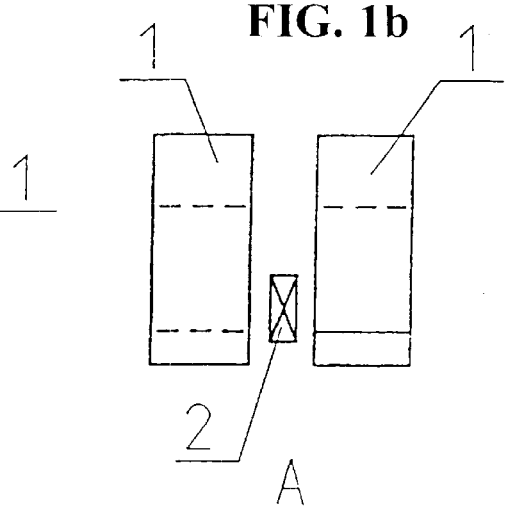
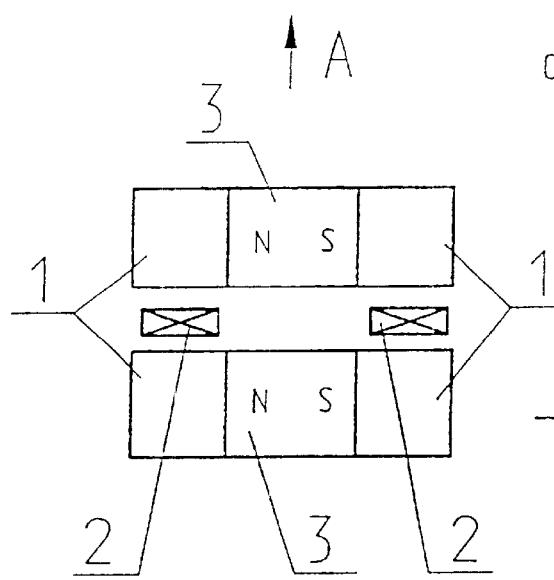
FIG. 1a
FIG. 1b
FIG. 1c
FIG. 1d

FIG. 4a
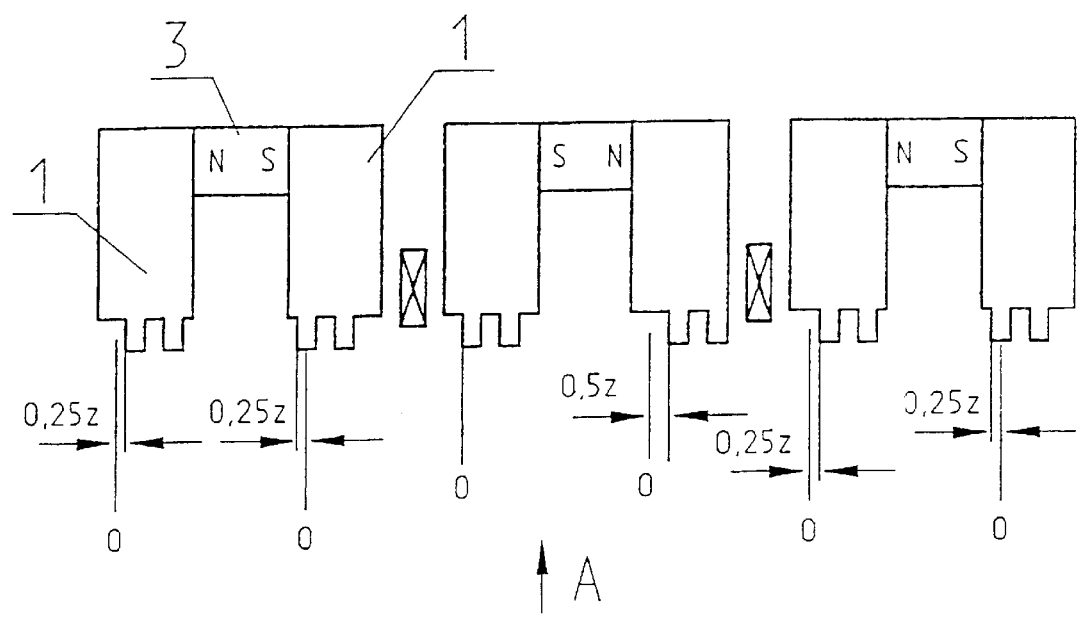
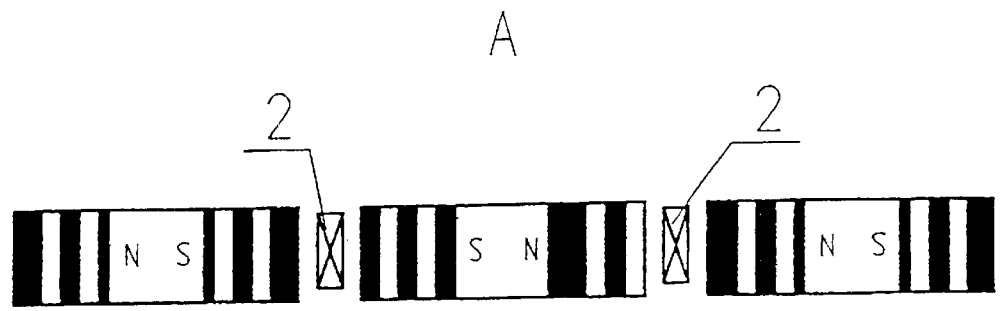
FIG. 4b

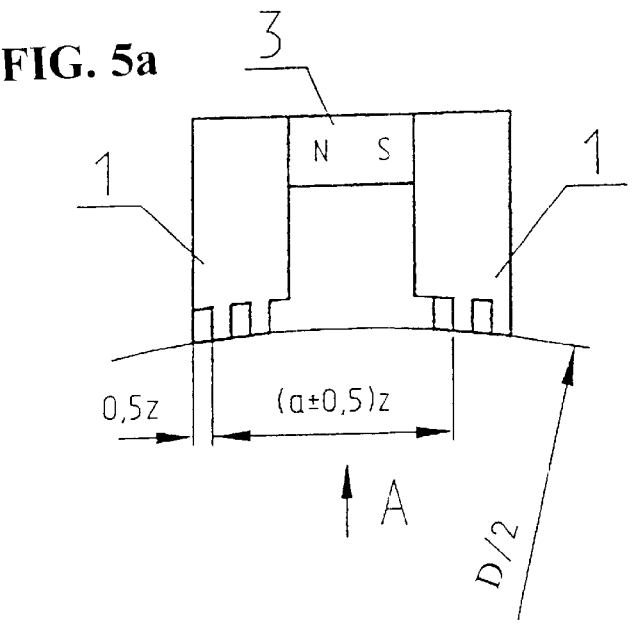
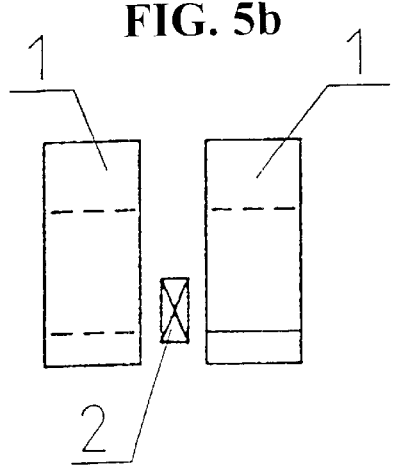
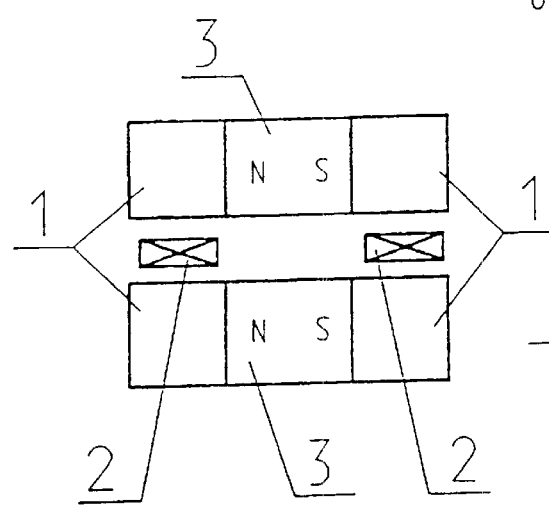
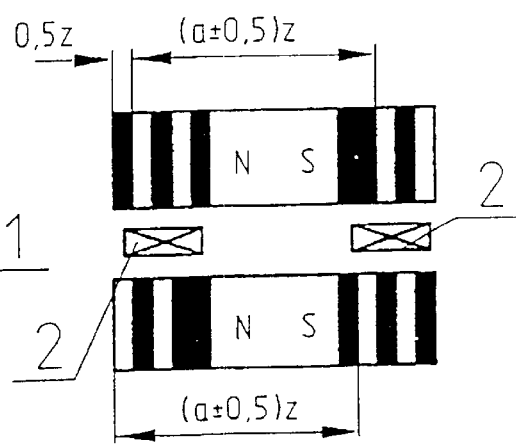
FIG. 5a
FIG. 5b
FIG. 5c
FIG. 5d

FIG. 7a
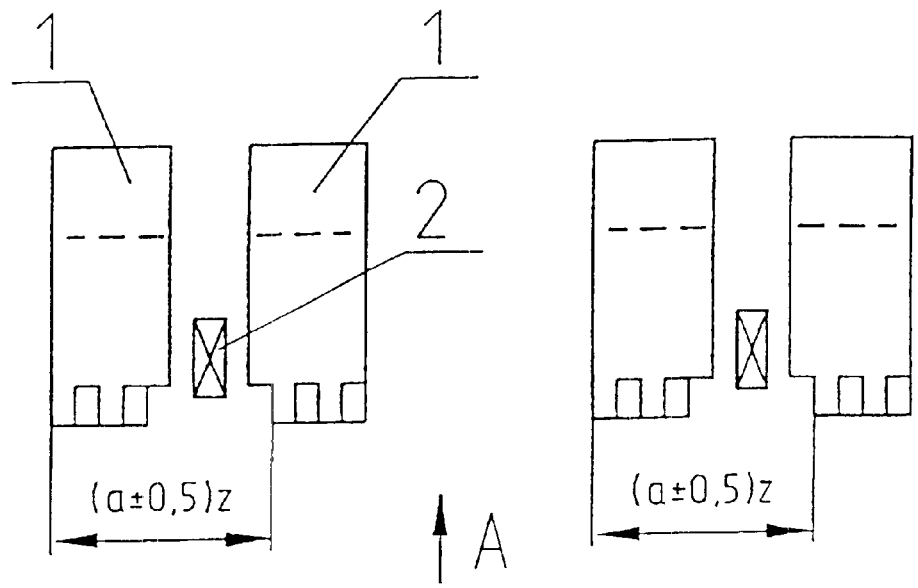
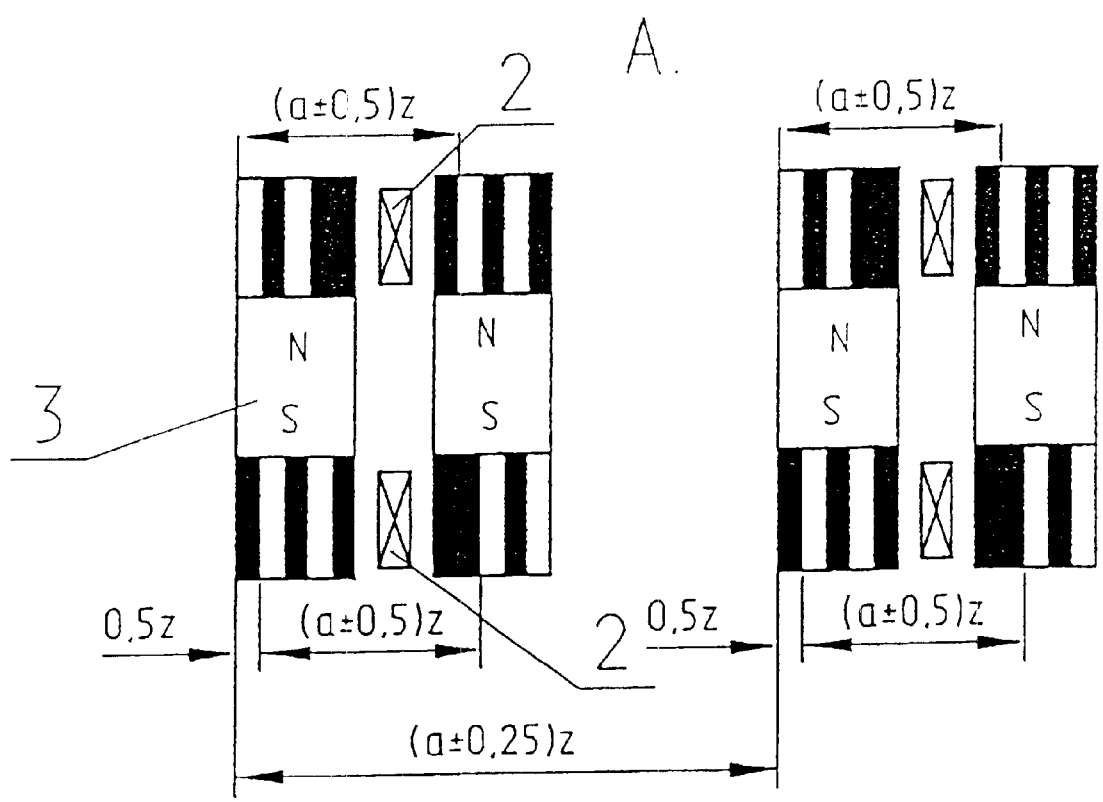
FIG. 7b

FIG. 9a
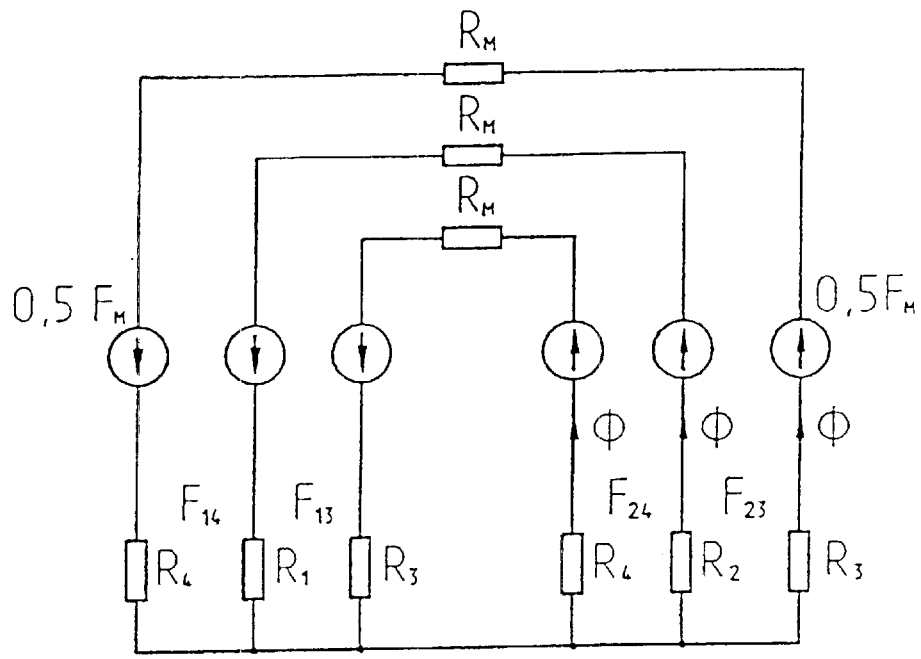
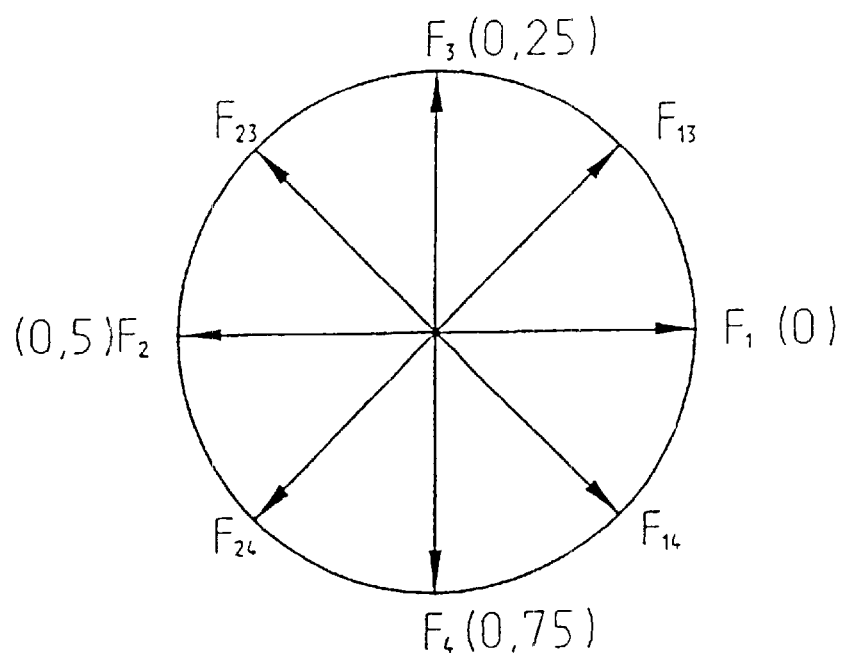
FIG. 9b

FIG. 10a
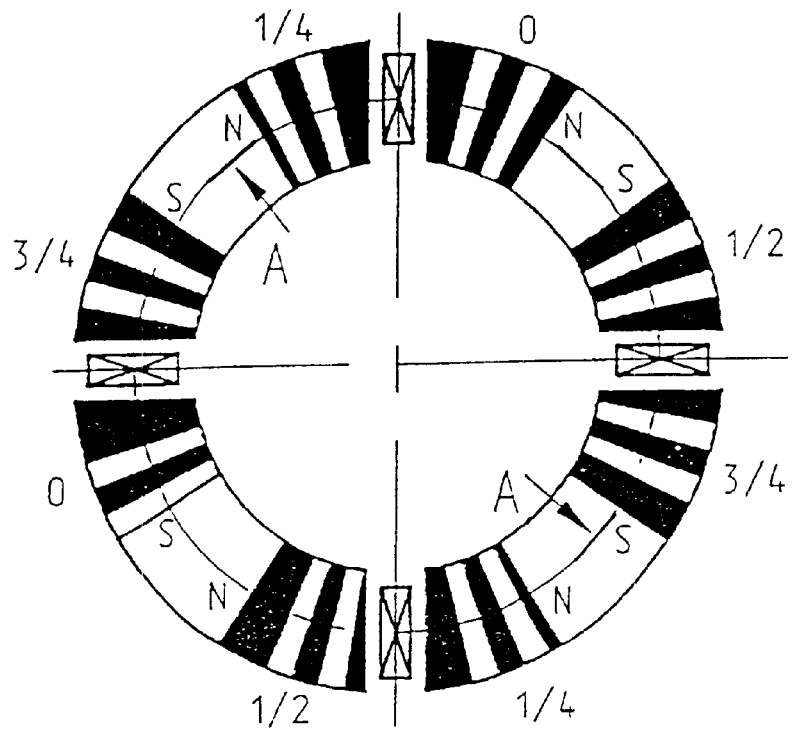
A - A turned view
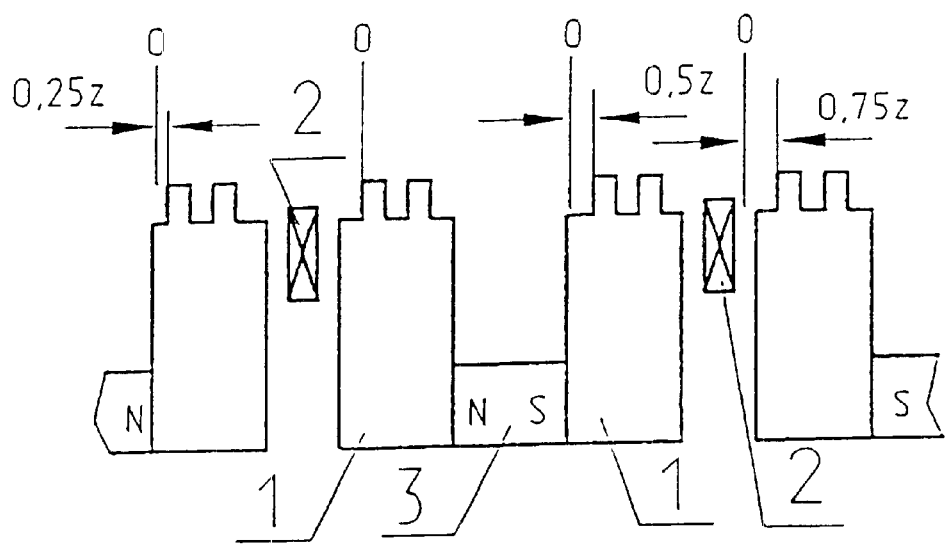
FIG. 10b

FIG. 11a
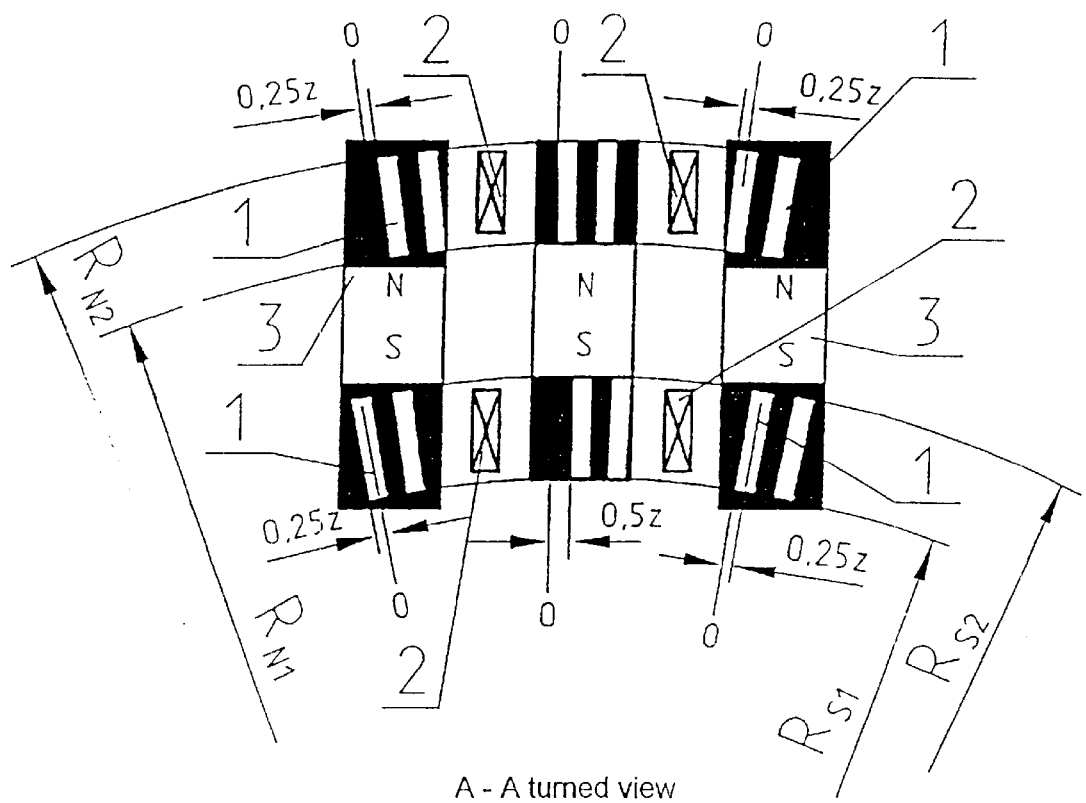
A - A turned view
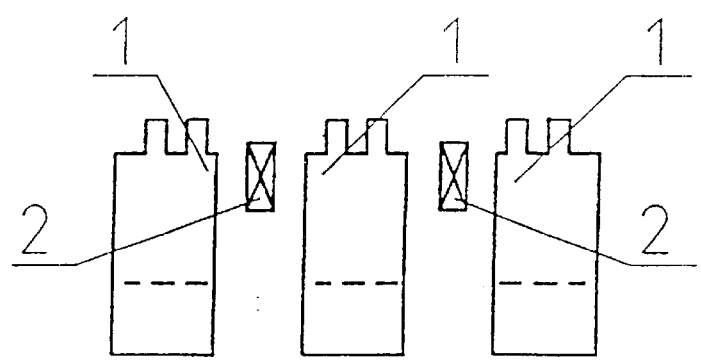
FIG. 11b

POSITION SENSOR FOR ARMATURE OF STEP MAGNETOELECTRIC MOTOR

The invention relates to electrical engineering, and in particular, to devices employed in a step magnetoelectric motor, and it is intended for generating the Sin and Cos of electrical signals that uniquely determine the position of the armature relative to the toothed structure of a motor stator.

There has been known the induction tachometer [1] consisting of two U-shaped magnetically soft cores, between which a permanent magnet is located. The magnetically soft cores bear windings. The drawback of this sensor is that its information signals depend both on the position and on the traverse velocity thereof.

There has also been known the device containing a U-shaped magnetic conductor and a permanent magnet, made as a flat rectangular plate placed on the internal side of the magnetic conductor [2]. The disadvantage of this device, when used as a position sensor for the armature of a step motor, is the dependence of an information signal both on the velocity and on the position of the armature. All this results in a major error in registration of the position of the armature of a step motor, whereas at motor cutoff the information signal of such a sensor is equal to zero.

The closest to the offered device is the position sensor for the armature of a planar step motor that contains two U-shaped magnetic conductors shunted by a permanent magnet. The magnetic conductors are made of three parts, between which the Hall converters [3] are arranged.

The disadvantage of the prototype is the presence of hysteresis of information signals that is due to reversal magnetization of U-shaped magnetic conductors. The reversal magnetization of U-shaped magnetic conductors also causes the dependence the information signal on the motion velocity of the armature, although in a lesser degree than in the prior art devices. The presence of air gaps, in which Hall converters are placed, results in that the information signal amplitude is nearly the order lower than the constant component of the signal. This results in limited thermal stability of the prototype's parameters.

The aim of the invention is to improve the metrological parameters of a position sensor and to provide an opportunity for using the sensor in linear, planar, edge and cylindrical step magnetoelectric motors.

The mentioned aim is achieved by that in the position sensor for the armature (PS) of the step magneto-electric motor containing two composite U-shaped magnetic conductors, on core poles of each magnetic conductor the teeth are formed, which teeth have the difference of group coordinates being equal to $(\alpha \pm 0,5)$ Z; and the position sensor for the armature further contains two magnetic induction converters; in one of the constituent parts of U-shaped magnetic conductors a permanent magnet is connected in series, and the magnetic induction converters are placed, in either mechanical or magnetic proximity, to the pair of like core magnetic poles of a pair of U-shaped magnetic conductors in such a way, that the output signal of converters is in direct proportion to the difference of magnetomotive forces of these magnetic poles.

Here $\alpha$ is an arbitrary integer and

Z is a teeth arrangement spacing.

The convention of using of a comma for decimal notation is used herein throu such that ½ is represented as 0,5 and ¼ is 0,25.

FIGS. 1a–1d show a first variant of the basic design of the position sensor for the armature of a step magnetoelectric motor.

FIGS. 4a and 4b show a fourth variant of the basic design of the position sensor for the armature of a step magnetoelectric motor with a third magnetic conductor that is identical to the former two magnetic conductors.

FIGS. 5a–5d show a fifth variant of the basic design of the position sensor for the armature of a step magnetoelectric motor with a mating part of diameter D.

FIGS. 7a and 7b show the basic design of the PS with four U-shaped magnetic conductors.

FIGS. 9a and 9b show a PS equivalent circuit with three U-shaped magnetic conductors and a circular chart illustrating the operation thereof, respectively.

FIGS. 10a and 10b show a first PS basic design for an edge step motor.

FIGS. 11a and 11b show a second PS basic design for an edge step motor.

The sensor is additionally provided with at least the third magnetic conductor, identical to the former two magnetic conductors, and with, at least, the third magnetic induction converter made as a Hall converter.

A permanent magnet may be connected in series with the back of an U-shaped magnetic conductor and with one of its cores. The teeth space shift of a pair of like magnetic poles belonging to the pair of U-shaped magnetic conductors located opposite, in mechanical or magnetic sense, can make $(\alpha \pm 0,5)$ Z or $(\alpha \pm 0,25)$ Z.

The permanent magnet is made of high-coercitivity materials, e.g., samarium-cobalt alloy.

The parts of cores and the backs of an U-shaped magnetic conductors may be made of a solid soft-magnetic material, e.g., electrical steel, that allows for easily changing the teeth direction either parallel or perpendicular to direction of the backs of U-shaped magnetic conductors.

According to an armature configuration, the U-shaped magnetic conductors may be placed either one by one at planes that are parallel to the front edge planes of their cores, or may be lined at a plane that coincides with the front edges plane of their cores.

The surface, which circumscribes the teeth ridges of the magnetic poles of the cores the U-shaped magnetic conductor, is configured in the shape of a plane of the stator of a step motor.

In order to employ the sensor in an edge step motor, the U-shaped magnetic conductors may be arranged in such a way that the poles of their cores lie on a circle ring. For the same purposes the sensor is made so that the plane of the teeth ridges of the N/S poles is shaped as a ring sector.

Figure 2A:
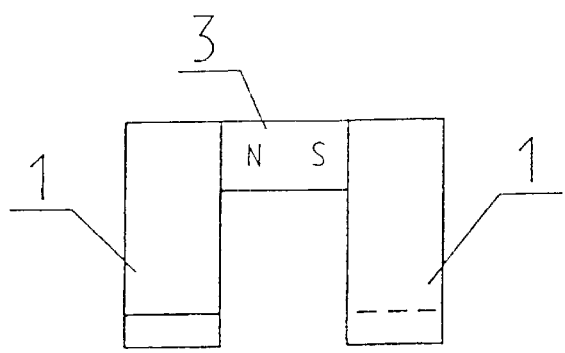
FIGS. 2a–2d show a second variant of the basic design of the position sensor for the armature of a step magnetoelectric motor.
Figure 2B:
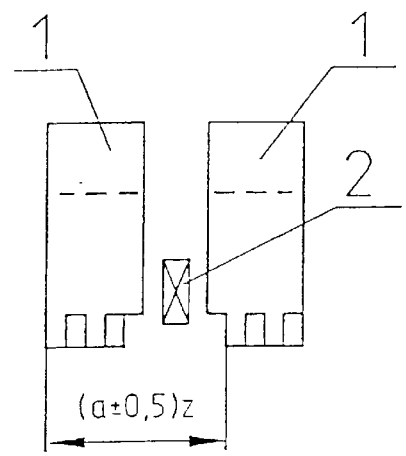
Figure 2C:
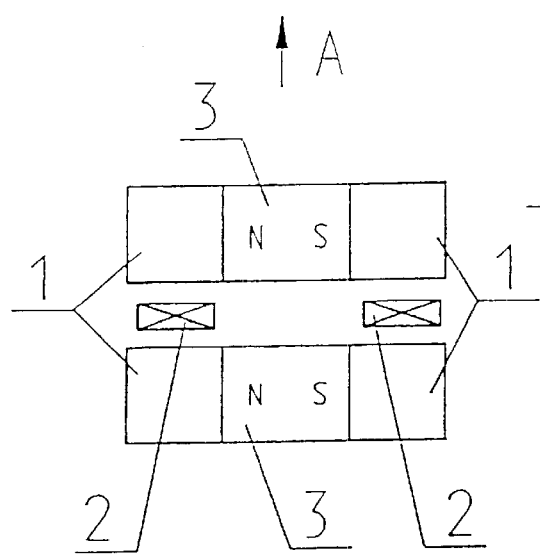
Figure 2D:
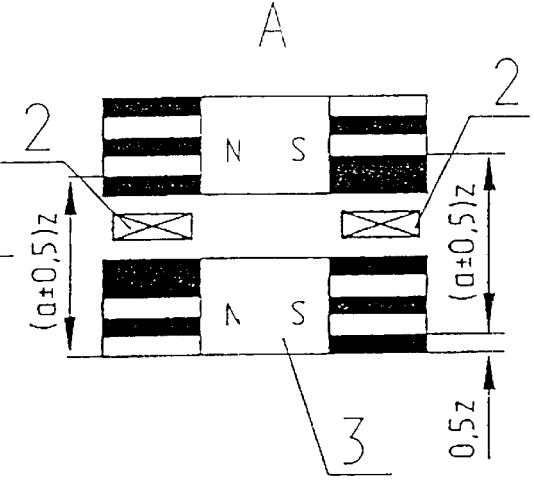
Figure 3A:
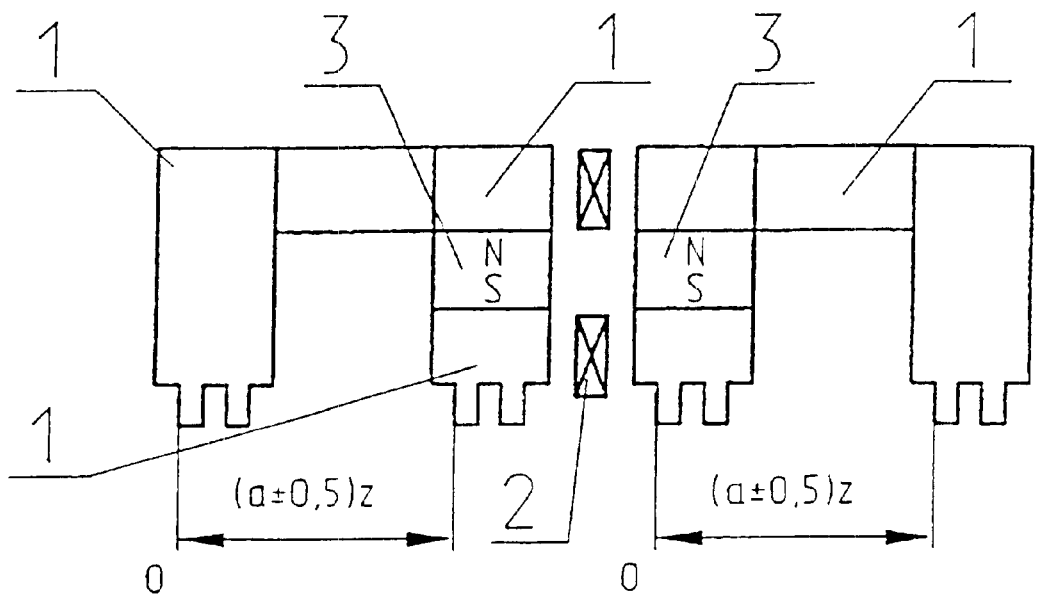
FIGS. 3a and 3b show a third variant of the basic design of the position sensor for the armature of a step magnetoelectric motor.
Figure 3B:
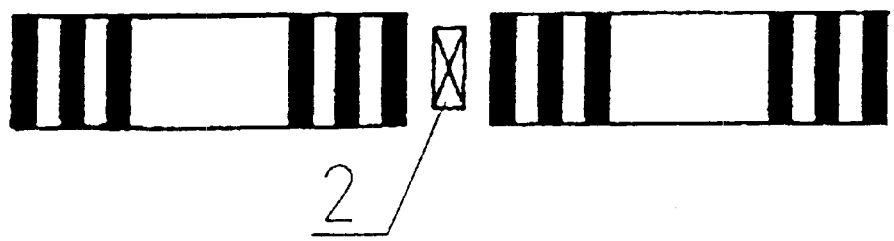

FIGS. 1–3 show the variants of the basic design of the position sensor for the armature of a step magnetoelectric motor according to claim 1, FIG. 4 is ditto to claim 2, FIG. 5 is ditto to claim 12.

Figure 6:
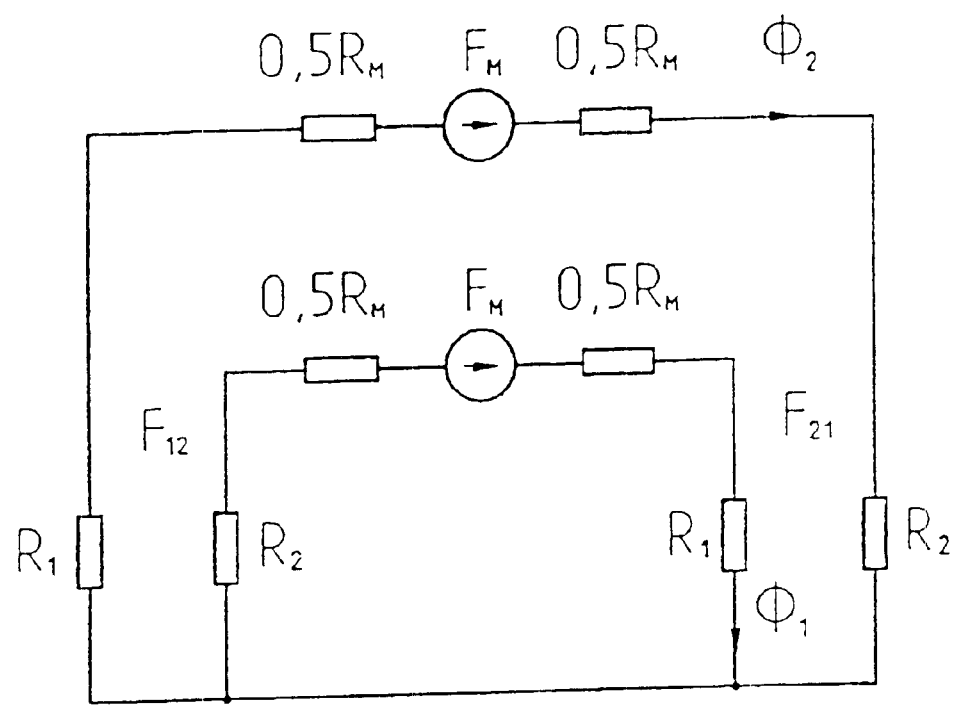
FIG. 6 shows an equivalent circuit of the PS with two U-shaped magnetic conductors. conductors.
Figure 8A:
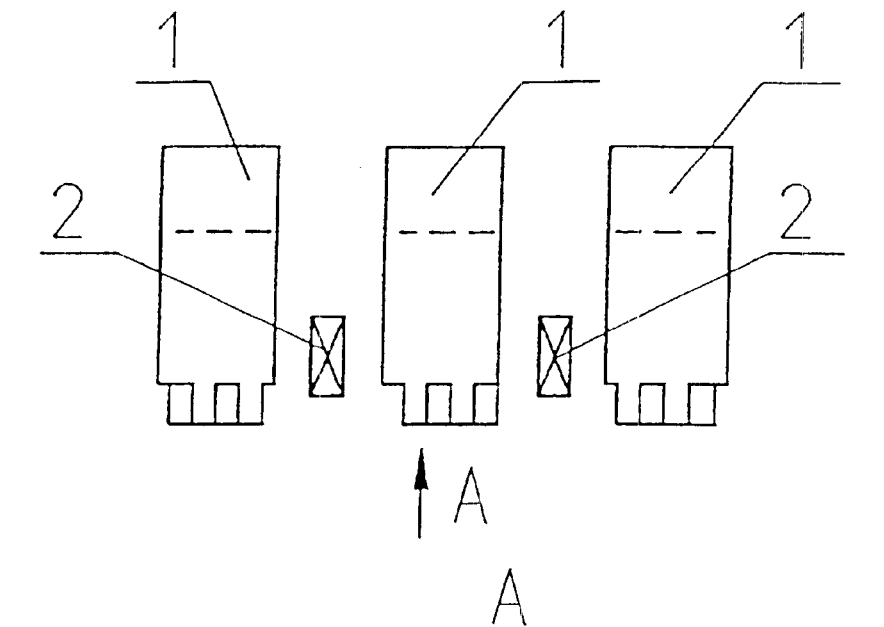
FIGS. 8a and 8b show the basic design of the PS with three U-shaped magnetic conductors.
Figure 8B:
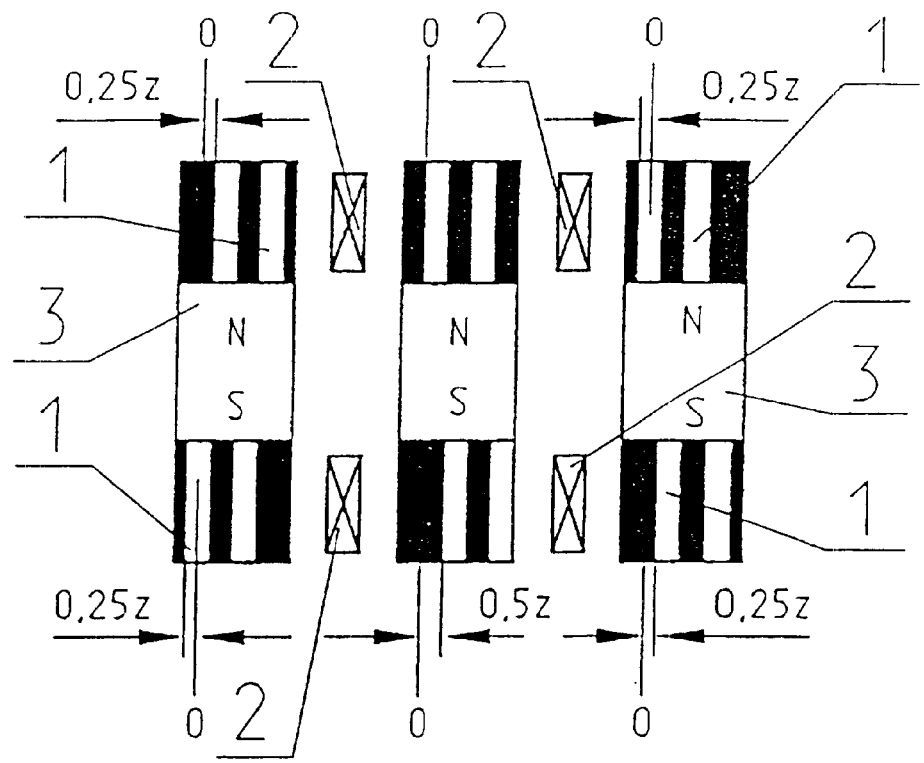

FIG. 6 is the equivalent circuit of the PS with two U-shaped magnetic conductors. FIG. 7 is the basic design of the PS with four U-shaped magnetic conductors, FIG. 8 is ditto with three U-shaped magnetic conductors. FIG. 9 represents the PS equivalent circuit with three U-shaped magnetic conductors and a circular chart illustrating the operation thereof. FIG. 10 and FIG. 11 show the PS basic designs for edge step motors.

The basic design of PS contains two composite U-shaped magnetic conductors, in which one of the constituent parts (in FIG. 1—the back (3) and (in FIG. 2—the core (1)) contains a permanent magnet 3 connected in series.

Two magnetic induction converters 2 are set, in mechanical (FIG. 1) or in magnetic (FIG. 3) proximity, to the pair of like magnetic poles of the core 1 of a pair of the U-shaped magnetic conductors in such a manner, that the output signal of the converters 2 is in direct proportion to the difference of magnetomotive forces of these magnetic poles. Teeth (in A view teeth are shown as white rectangular strips) and recesses (in A view spaces are shown as black rectangular strips). are formed on the core poles of each magnetic conductor. The difference of the position coordinate between the like teeth (group coordinates) of two poles in U-shaped magnetic conductor is equal to $(\alpha \pm 0,5)$ Z.

The operation of the offered sensor will be considered by an example of using the sensor in a planar step magneto-electric motor with combined coordinates. The planar motor contains a ferromagnetic toothed stator and an armature. The stator is made as a sheet of ferromagnetic material with slots on the upper surface, the slots are filled with non-magnetic material. The slots are located on X, Y axes of Cartesian coordinates. At motor operation, three position sensors are attached to the armature (for example, two sensors relate to X coordinate and one relates to Y coordinate). Two position sensors relating to one of the motor coordinates allow to readily ascertain the fact of an armature turn according to the difference of sensors indications, and, to control thereby this undesirable phenomenon by means of an appropriate control algorithm. In practice, position sensors are generally built in the armature body still at the manufacture stage. In order the X's (Y's) sensor did not react to the movement in the orthogonal direction, the teeth length is selected to be close in magnitude to the integer number of teeth arrangement spacings.

The operating air gap between the armature and the stator is provided by an air cushion (in general case—by different types of bearings). In order to provide an air cushion, the compressed air is discharged into the armature. In this case the attraction force applied by the armature permanent magnets to the stator is balanced by the repulsive force created by the air pressure, and the armature "floats up" above the stator. The armature moves along the stator at the cost of the energy of electromagnetic interaction of the traction electromagnets of the armature with the toothed structure of the stator.

The concept of the sensor operation will be described by analyzing its equivalent circuit (see FIG. 2). As the first approximation it may be assumed that $$R_1 = R_0 - R_m \cos(2\pi X/Z), \quad (1)$$

wherein $R_1$ is a magnetic resistance of the air gap between the stator and the pole of the core of the U-shaped magnetic conductor of the sensor, which teeth are located opposite to the motor stator's teeth;

$R_0$, $R_m$ are correspondingly the constant component and the amplitude of the first harmonic of a $R_1$ magnetic resistance at moving the armature relative to the stator;

X is the coordinate, along which the sensor travels.

In its turn, the magnetic resistance of the air gaps of the poles of the cores of magnetic conductors, wherein teeth are shifted relative to the zero position at 0,5 Z; 0,25Z; −0,25Z, will be correspondingly equal to:

$$R_2 = R_0 + R_m \cos(2\pi X/Z), \quad (2)$$

$$R_3 = R_0 - R_m \sin(2\pi X/Z), \quad (3)$$

$$R_4 = R_0 + R_m \sin(2\pi X/Z). \quad (4)$$

The magnetic fluxes $\Phi_1$, $\Phi_2$, created by PS permanent magnets are equal to:

$$\Phi_1 = \Phi_2 = F_M/(R_M + R_1 + R_2) = F_M/(R_M + 2R_0) = \Phi. \quad (5)$$

Then the magnetomotive force is equal to $$F_{12} = -F_{21} = \Phi(R_2 - R_1) = 2\Phi R_M \cos(2\pi X/Z). \quad (6)$$

As the Hall converters 2 are located between the magnetic resistances $R_1$ and $R_2$, their information signals $e_x$ are in direct proportion to the amplitudes of the magnetomotive forces $F_{12}$, $F_{21}$ also are phase shifted at 180°.

In practice, because of the spread of the technological and design parameters of PS, the output signal $e_x$ apart from the first harmonic contains a small constant component of the second harmonic of the same polarity. To eliminate them the differential connection of Hall converters is used.

It is necessary to note that according to the expression (6) the position of the step motor may be determined by such PS, when one a priori knows, in what quadrant of a unit circle he resides. However, this drawback is easily overcome by using the second similar PS (FIG. 3), shifted relative to the first one in the direction of travel at a quarter of period. Indeed, in this case in accordance with formulas (3) and (4), the output signal of the second PS's is equal to $$F_{43} = 2\Phi R_M \sin(2\pi X/Z). \quad (7)$$

Thus, the proposed sensor allows for generating two orthogonal signals, according to which the position of the step motor armature with respect to the teethed stator structure is uniquely determined.

Improvement of the accuracy of the proposed position sensor of the armature of the planar step motor is explained as follows:

1. At traveling of a PS above the stator of a planar motor the poles of the magnetic conductors of the sensor are not reversionary magnetized, i.e. hysteresis is absent. This is also promoted with that the parameters of a permanent magnet (due to the lack of reverse magnetization) may be selected so that the sensor poles "operate" at high magnetic induction values, where the non-linearity and hysteresis of the magnetic conductor materials can be neglected.

2. The high level of the magnetic induction in sensor poles makes it insensible to the magnetic track of the motor armature.

3. With regard to the magnet and due to the PS design, the Hall converters react to the difference magnetic flux, i.e. the sensor has a major modulation index and, hereupon, it:

a) has a high temperature stability;

b) is noiseproof to unidirectional homogeneous magnetic fields;

c) is less critical to inclinations.

The ability of Hall converters for electrically differential connection also provides for improving of the metrological characteristics of the proposed position sensor due to:

d) improvement of the temperature stability;
e) reduction of the coefficient of nonlinear distortions of output signals,
f) easy provision of a symmetrization of output signals relative to the zero level.

FIGS. 3–4. show the basic design of a "narrow" position sensor, which in some cases can be better incorporated in a specific design of armatures for motors. The PS for a step cylindrical motor with a mating part diameter D is shown in FIG. 5.

The PS design shown in FIG. 8 employs only three U-shaped magnetic conductors, which may be compared favorably with the above considered circuit with two orthogonal signals. The PS according to claim 3 differs from the base structure in that the teeth spatial shift of a pair of the like magnet poles of the adjacent pair of U-shaped magnetic conductors placed opposite one another is $(\alpha \pm 0,25)$ Z. The PS consists of three composite U-shaped magnetic conductors and of four Hall converters 2, placed between the like magnetic poles of the cores 1. The operation concept of the position sensor will be described by analyzing its equivalent circuit.

As magnetic resistances $R_{M1}=R_{M2}=R_{M3}=R_M$ and magnetomotive forces $F_{M1}=F_{M2}=F_{M3}=F_M$ of permanent magnets are equal, then the magnetic fluxes $\Phi_1=\Phi_2=\Phi_3=\Phi$. Therewith $$\Phi=F_M/(R_M+R_1+R_2)=F_M/(R_M+2R_0). \tag{8}$$

Since the Hall converters are located between the magnetic resistances $R_1 \leftrightarrows R_3$, $R_1 \leftrightarrows R_4$, $R_2 \leftrightarrows R_3$, $R_2 \leftrightarrows R_4$, then in order to derive their information signals it is necessary to know the magnetomotive forces $F_{13}$, $F_{14}$, $F_{23}$, $F_{24}$. As it comes out from the sensor equivalent circuit:

$$F_{13}=\Phi(R_1-R_3)=\Phi R_m (\text{Sin } 2\pi x/z - \text{Cos } 2\pi x/z) = -\sqrt{2}\Phi R_{m \text{ Cos}(2\pi x/z-\pi/4)}; \tag{9}$$

$$F_{14}=\Phi(R_1-R_4)=\Phi R_m(-\text{Sin } 2\pi x/z - \text{Cos}2\pi x/z) = -\sqrt{2}\Phi R_{m \text{ Cos}(2\pi x/z+\pi/4)}; \tag{10}$$

$$F_{23}=\Phi(R_2-R_3)=\Phi R_m(\text{Cos } 2\pi x/z + \text{Sin } 2\pi x/z) = \sqrt{2}\Phi R_{m \text{ Cos}(2\pi x/z+\pi/4)}; \tag{11}$$

$$F_{24}=\Phi(R_2-R_4)=\Phi R_m(\text{Cos } 2\pi x/z - \text{Sin } 2\pi x/z) = \sqrt{2}\Phi R_{m \text{ Cos}(2\pi x/z-\pi/4)}. \tag{12}$$

As the Hall converters information signals are directly proportional to the magnetomotive forces $F_{13}$, $F_{24}$, $F_{23}$, $F_{14}$, then it comes out from the formulas (9–12) that the proposed position sensor has two pairs of reverse phase signals $F_{13}$–$F_{24}$, $F_{14}$–$F_{23}$ shifted relative one another at 90°.

Whereas Hall converters 2 are connected in a differential way, the PS output signals are in direct proportion to:

$$E_1 = F_{24} - F_{13} = 2\sqrt{2}\Phi R_m \text{Cos}(2\pi x/z - \pi/4), \tag{13}$$

$$E_2 = F_{23} - F_{14} = 2\sqrt{2}\Phi R_m \text{Cos}(2\pi x/z + \pi/4). \tag{14}$$

Qualitatively the PS operation can be analyzed by means of a circular chart (FIG. 9), wherein the spatial phase shifts of the magnet pole teeth of the cores 1 of the PS magnetic conductor are put in brackets.

FIG. 10 represents the basic design of the position sensor for the edge step motor. It differs from the above considered position sensor in that the U-shaped magnetic conductors are arranged in such a manner that the poles of the cores lay on a circular ring. This is because the teeth on the poles have a form of a circular sector. In case of using the position sensor for an edge step motor (FIG. 8), the ridge plane of its N/S poles teeth is made in a form of a circular sector. The linear dimensions and the number of teeth are derived from the equation:

$$((R^2_{N2}-R^2_{N1})n_N)/((R^2_{S2}-R^2_{S1})n_S)=1.$$

Here $R_{N2}$, $R_{S2}$ are the external radiuses for N and S poles, accordingly;

$R_{N1}$, $R_{S1}$—internal radiuses for N and S poles, accordingly.

$n_N$, $n_s$—amount of teeth on N and S poles, accordingly.

This expression results from the equality of $R_o$ constant components for the appropriate poles.

For the proposed invention the engineering documents were developed and trial samples of the position sensor were fabricated. The tests manifested their high metrological characteristics. For instance, the PS application for a planar servodrive provides the positioning of a step magnetoelectric motor with the accuracy not worse than ±1 microns.

What is claimed is:

1. A position sensor for the armature of a step magnetoelectric motor, comprising two composite U-shaped magnetic conductors, on the core poles of each magnetic conductor teeth are formed, which group coordinates difference is equal to $(\alpha+0,5)$ Z, and further comprising two magnetic induction converters, characterized in that in one of the constituents of U-shaped magnetic conductors a permanent magnet is connected in series, and the magnetic induction converters are placed in either mechanical or magnetic proximity to the pair of like core magnetic poles of a pair of U-shaped magnetic conductors in such a way, that the converters output signal is directly proportional to the difference of the magnetomotive forces of these magnetic poles, wherein $\alpha$ is an arbitrary integer; Z is a teeth arrangement spacing and the sensor is provided with at least the third magnetic conductor that is identical to the former two magnetic conductors.

2. The sensor according to claim 1, characterized in that a permanent magnet is connected in series with the back of each of the U-shaped magnetic conductors.

3. The sensor according to claim 1, characterized in that a permanent magnet is connected in series with the core of each of the U-shaped magnetic conductors.

4. The sensor according to claim 1, characterized in that the spatial shift of the teeth of a pair of the like magnetic poles of the pair of U-shaped magnetic conductors that are located opposite in the mechanical or magnetic sense, makes $(\alpha \pm 0,5)$ Z.

5. The sensor according to claim 1, characterized in that the spacial shift of the teeth of a pair of like magnetic poles of the pair of U-shaped magnetic conductors that are located opposite makes $((\alpha \pm 0,25)$ Z.

6. The sensor according to claim 1, characterized in that the permanent magnet is made of high-coercitivity materials, e.g. of a samarium-cobalt alloy.

7. The sensor according to claim 1, characterized in that the parts of cores and backs of U-shaped magnetic conductors are made of a solid soft-magnetic material, e.g., of electrical steel.

8. The sensor according to claim 1, characterized in that the teeth direction of the poles is chosen parallel to the direction of the back of the U-shaped magnetic conductors.

9. The sensor according to claim 1, characterized in that the direction of pole teeth is chosen perpendicular to the direction of the back of U-shaped magnetic conductors.

10. The sensor according to claim 1, characterized in that the surface that circumscribes the teeth ridges of the magnetic poles of the cores of the U-shaped magnetic conductors is configured in a shape of a plane of the stator of the step motor.

11. The sensor according to claim 1, characterized in that the U-shaped magnetic conductors are aligned at the plane that coincides with the front edges of their cores.

12. The sensor according to claim 11, characterized in that the U-shaped magnetic conductors are arranged in such a way that the poles of their cores lie in a circle ring, in particular, in a circular sector.

13. The sensor according to claim 1, characterized in that the magnetic induction converters are made as Hall converters.

14. A position sensor for the armature of a step magnetoelectric motor, comprising two composite U-shaped magnetic conductors, on the core poles of each magnetic conductor teeth are formed, which group coordinates difference is equal to $(\alpha+0,5)$ Z, and further comprising two magnetic induction converters, characterized in that in one of the constituents of U-shaped magnetic conductors a permanent magnet is connected in series, and the magnetic induction converters are placed in either mechanical or magnetic proximity to the pair of like core magnetic poles of a pair of U-shaped magnetic conductors in such a way, that the converters output signal is directly proportional to the difference of the magnetomotive forces of these magnetic poles, wherein $\alpha$ is an arbitrary integer; Z is a teeth arrangement spacing and the sensor is provided with at least the third magnetic conductor that is identical to the former two magnetic conductors and with at least the third magnetic induction converter.

15. A position sensor for the armature of a step magnetoelectric motor, comprising two composite U-shaped magnetic conductors, on the core poles of each magnetic conductor teeth are formed, which group coordinates difference is equal to $(\alpha+0,5)$ Z, and further comprising two magnetic induction converters, characterized in that in one of the constituents of U-shaped magnetic conductors a permanent magnet is connected in series, and the magnetic induction converters are placed in either mechanical or magnetic proximity to the pair of like core magnetic poles of a pair of U-shaped magnetic conductors in such a way, that the converters output signal is directly proportional to the difference of the magnetomotive forces of these magnetic poles, wherein $\alpha$ is an arbitrary integer; Z is a teeth arrangement spacing and the U-shaped magnetic conductors are placed one by one at the planes that are parallel to the planes of the front edges of their cores.

16. The sensor according to claim 15, characterized in that the plane of teeth ridges of N/S poles is made in a form of a circular sector, and the number and the linear dimensions of teeth being derived from the equation:

$$((R^2_{N2}-R^2_{N1})n_N)/((R^2_{S2}-R^2_{S1})n_S)=1,$$

wherein $R_{N2}$, $R_{S2}$ are the external radiuses for N and S poles accordingly;

$R_{N1}$, $R_{S1}$ are the internal radiuses for N and S poles accordingly.

$n_N$, $n_S$ are the amount of teeth on N and S poles accordingly.

* * * * *